July 18, 1961     A. A. LIGHTY     2,993,163
ALTERNATING CURRENT GENERATING SYSTEM
Filed Dec. 6, 1954
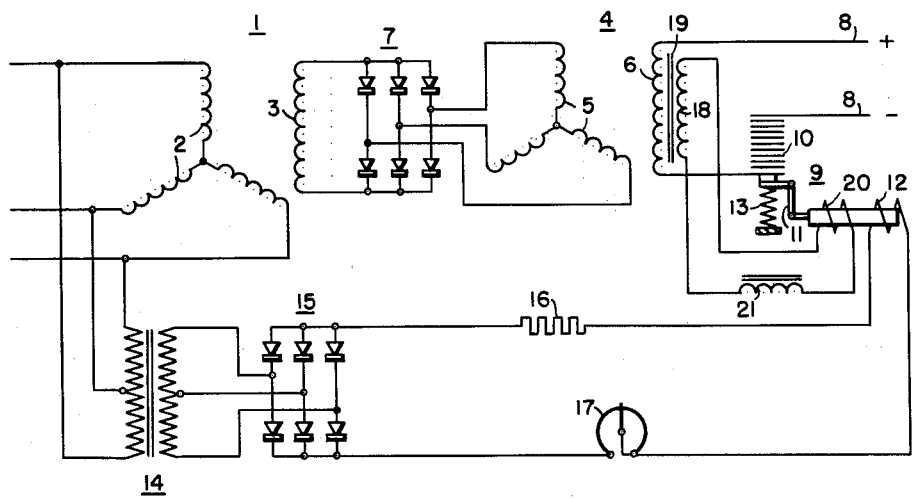
WITNESSES
INVENTOR
Alfred A. Lighty
BY
ATTORNEY United States Patent Office 2,993,163
Patented July 18, 1961

2,993,163
ALTERNATING CURRENT GENERATING SYSTEM
Alfred A. Lighty, Fairborn, Ohio, assignor to Westinghouse Electric Corporation, East Pittsburgh, Pa., a corporation of Pennsylvania
Filed Dec. 6, 1954, Ser. No. 473,290
3 Claims. (Cl. 322—19)

The present invention relates to alternating current generating systems, and more particularly to an improved excitation system for regulated alternating current generators.

Regulated alternating current generator systems usually include an alternating current generator which is supplied with direct current excitation from an exciter, or other source of direct current, and the output voltage of the generator is controlled by a voltage regulator which senses the generator voltage and controls the generator excitation, usually by controlling the excitation of the exciter, to maintain the generator output voltage at a predetermined value. In such a system, when the generator field is initially excited or when a sudden change of load occurs, the action of the regulator causes a transient overshoot of the generator voltage. That is, under these conditions, when the output voltage of the generator deviates from the normal value, the regulator, in attempting to restore the voltage, causes it to overshoot the normal value and then brings it back. If no stabilizing means is provided in the system for minimizing this action, the transient overshoot, and the time required for the voltage to recover to its normal value, may be excessive, and under certain conditions the generator voltage may develop sustained oscillations about the normal value. For this reason, it is necessary to provide stabilizing means in such systems to prevent excessive transient overshoot of the voltage and to keep the time of recovery of the voltage as short as possible. One means of doing this is to provide a feedback signal which is applied to the regulator and which tends to oppose the change in voltage. Such a signal is preferably proportional to the rate of change of the exciter output voltage or of the generator output voltage. The means which have been used for obtaining such a signal, however, have frequently been relatively complicated and expensive, or have substantially increased the weight of the system, which is undesirable in some types of generating systems such as those used on aircraft. In some systems it is not possible to obtain a signal responsive to the rate of change of the exciter voltage by the conventional means since the exciter output terminals may not be accessible.

The principal object of the present invention is to provide a simple and effective stabilizing means for regulated alternating current generating systems which is applicable to any type of generating system.

Another object of the invention is to provide a regulated alternating current generating system in which a stabilizing winding is provided in inductive relation with a field winding of the system, so that when the field excitation is changed, a voltage is induced in the stabilizing winding, and this voltage is applied to the voltage regulator to prevent excessive transient overshoot of the generator voltage and excessive time of recovery.

A further object of the invention is to provide a regulated alternating current generating system in which a stabilizing signal is derived from a change in field excitation and in which means are provided for applying the stabilizing signal to the voltage regulator in a predetermined time phase relation to a regulator signal derived from the generator output voltage.

Other objects and advantages of the invention will be apparent from the following detailed description, taken in connection with the accompanying drawing, the single figure of which is a schematic diagram showing an illustrative embodiment of the invention.

The invention is shown in the drawing applied to a generator system of the so-called brushless type, in which there are no sliding contacts and no slip rings or brushes, but it will be apparent that the invention is not limited to systems of this particular type but is generally applicable to any type of regulated alternating current generator. The system shown in the drawing includes an alternating current generator 1, which may be of any suitable physical construction, and which includes a three-phase armature winding 2 disposed on the stator member of the machine. The generator 1 also has a field winding 3 which is carried on the rotor of the machine and which is adapted to be supplied with direct current excitation.

The excitation for the generator 1 is supplied by an exciter 4 which is shown as an alternating current machine and which may be of any suitable physical construction. The exciter 4 has a three-phase armature winding 5, which is carried on the rotor of the machine, and has a field winding 6 on the stator of the machine. The rotor of the exciter 4, carrying the armature winding 5, is preferably mounted on a common shaft with the rotor of the generator 1. The alternating current output of the exciter armature 5 is supplied to a rotating three-phase rectifier 7, which is also mounted on the common shaft, and the direct current output of the rectifier 7 is connected to the generator field winding 3. In this way an excitation system is provided for the generator 1 which requires no commutator or slip rings and no brushes. The field winding 6 of the exciter 4 is supplied with direct current in any desired manner and is shown as being separately excited from a direct current line 8. Any available source of direct current excitation may be utilized, or if desired, the field winding 6 might be excited from a pilot exciter of any suitable type driven from the generator shaft.

The output voltage of the generator 1 is controlled by means of a voltage regulator 9 which controls the field excitation and thus controls the output voltage. In the illustrated embodiment of the invention, the regulator 9 controls the excitation of the exciter 4 to vary its output voltage and thus control the excitation of the generator field winding 3. The regulator 9 is shown, for the purpose of illustration, as being of the carbon pile type with a stack or pile 10 of carbon discs connected in series with the exciter field winding 6. The resistance of the carbon pile 10 is varied by means of a pressure mechanism 11 of any suitable type which is actuated by a coil 12 acting in opposition to a spring 13.

The coil 12 is energized by a voltage signal derived from the output voltage of the generator 1. Any suitable means may be used for this purpose such as a transformer 14 connected to the output voltage of the generator 1. The transformer 14 is shown as having primary and secondary windings connected in a three-phase open-delta connection, the primary windings being connected directly across the generator voltage. The secondary windings of the transformer 14 are connected to a three-phase rectifier bridge 15 so that the direct current output of the rectifier is proportional to the average of the three phase voltages of the generator 1. The direct current output of the rectifier 15 is connected to the coil 12 of the regulator 9 through a resistor 16 and a voltage adjusting rheostat 17.

In a system of this type, as so far described, there may be an undesirably large transient overshoot of the voltage when the generator field winding is initially energized or when a sudden change of load occurs, due to the action of the regulator 9 in attempting to bring the voltage to its predetermined value for which the regulator is set. In accordance with the present invention, a simple and effective stabilizing means is provided for minimizing the transient overshoot and time of recovery of the voltage. For this purpose, a stabilizing winding 18 is provided on the exciter field structure. The stabilizing winding 18 is wound on the magnetic structure of the exciter field member, diagrammatically represented by the core 19, so that the stabilizing winding is in inductive relation with the exciter field winding 6. The stabilizing winding 18 is connected to a coil 20 on the voltage regulator 9, so that the voltage of the winding 18 is applied to the regulator 9 to affect its response.

It will be seen that under normal steady-state conditions there will be no voltage across the stabilizing winding 18 and it will have no effect on the operation of the system. During initial excitation of the generator field 3, however, or upon the occurrence of a sudden change of load, the regulator 9 will change the excitation of the field winding 6 to bring the generator voltage to its normal value. The rapid change in current in the exciter field winding 6 causes a voltage to be induced in the stabilizing winding 18 which is proportional to the rate of change of the exciter field flux. The generated voltage of the exciter 4 is proportional to its field flux and the voltage induced in the stabilizing winding 18, therefore, will be approxmiately proportional to the rate of change of the output voltage of the exciter. This voltage of the stabilizing winding is applied to the voltage regulator 9 and tends to oppose the change in excitation so that it produces a stabilizing action which reduces the transient overshoot of the voltage and the time of recovery of the voltage.

The effectiveness of the stabilizing winding may be increased by providing means for introducing the stabilizing signal into the voltage regulator at a predetermined time phase relation to the voltage signal applied to the regulator coil 12. By applying the stabilizing signal in the proper time relationship to the voltage signal a very effective stabilizing action is obtained and the time of recovery of the generator voltage is further reduced. This may readily be done by connecting a phase-shifting means in the circuit of the stabilizing coil 18. In the embodiment shown in the drawing, a reactor 21 is connected in series with the stabilizing coil 18 for this purpose, and by properly selecting the value of the reactor 21 the effectiveness of the coil 18 can be greatly increased by properly predetermining the time phase relation of the stabilizing signal to the voltage signal. It will be understood that any suitable phase shifting means might be utilized such as a combination of resistance and capacitance or any other suitable impedance or phase shifting network.

It should now be apparent that a stabilizing means has been provided for a regulated alternating current generating system which is relatively simple but very effective. The stabilizing signal is approximately proportional to the rate of change of the exciter output voltage, but it is readily obtained even in a system such as the brushless system described in which the output terminals of the exciter are on the rotating member and are not accessible. The simple stabilizing winding is easily wound on the exciter field structure and does not materially increase the size or weight of the complete system. The stabilizing winding can, of course, be applied to the generator field structure in systems in which the regulator controls the generator field current directly, and it will be obvious that other modifications may be made within the scope of the invention. It is to be understood, therefore, that the invention is not limited to the specific type of generating system shown, but is generally applicable to any type of alternating current generator system provided with any type of voltage regulator.

I claim as my invention:

1. An alternating current generating system including an alternating current generator, excitation means for said generator including a field winding excited by direct current, regulating means for controlling the excitation of said field winding to maintain a predetermined generator output voltage, a stabilizing winding in inductive relation with the field winding, and means for applying the voltage of the stabilizing winding to the regulating means, and phase-shifting means connected in series with the stabilizing winding.

2. In combination, an alternating current generator having a field winding, an exciter for supplying excitation to the generator field winding, said exciter having a field winding adapted to be supplied with direct current excitation, regulating means for controlling the excitation of the exciter field winding to maintain a predetermined generator output voltage, a stabilizing winding disposed in inductive relation with the exciter field winding, means for applying the voltage of the stabilizing winding to the regulating means, and phase-shifting means connected in series with the stabilizing winding.

3. In combination, an alternating current generator having a field winding, an exciter for supplying excitation to the generator field winding, said exciter having a field member and an armature member, a field winding on said field member adapted to be excited by direct current, regulating means responsive to the generator output voltage for controlling the excitation of the exciter field winding to maintain a predetermined generator output voltage, a stabilizing winding on the exciter field member in inductive relation with the exciter field winding, means for applying the voltage of the stabilizing winding to the regulating means, and a phase-shifting impedance connected in series with the stabilizing winding.

References Cited in the file of this patent

UNITED STATES PATENTS

| | | |
|---|---|---|
| 1,100,895 | Liljenroth | June 23, 1914 |
| 1,420,761 | Schon | June 27, 1922 |
| 1,708,747 | Whiting | Apr. 9, 1929 |
| 1,933,858 | Keller | Nov. 7, 1933 |
| 2,274,356 | Blankenbuehler | Feb. 24, 1942 |
| 2,453,341 | Rady | Nov. 9, 1948 |
| 2,525,495 | Lynn | Oct. 10, 1950 |
| 2,526,133 | Haas | Oct. 17, 1950 |
| 2,529,766 | Gartner et al. | Nov. 14, 1950 |
| 2,722,652 | Brainard | Nov. 1, 1955 |
| 2,804,589 | Penn | Aug. 27, 1957 |

FOREIGN PATENTS

| | | |
|---|---|---|
| 81,711 | Sweden | Oct. 16, 1934 |